(12) United States Patent
Nikawa et al.

(10) Patent No.: US 12,244,165 B2
(45) Date of Patent: Mar. 4, 2025

(54) SELECTING DEVICE, SELECTING METHOD AND COMPUTER READABLE STORAGE MEDIUM

(71) Applicant: HONDA MOTOR CO.,LTD., Tokyo (JP)

(72) Inventors: Hidefumi Nikawa, Saitama (JP); Hirotaka Endo, Saitama (JP); Takashi Sone, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 530 days.

(21) Appl. No.: 17/553,823

(22) Filed: Dec. 17, 2021

(65) Prior Publication Data

US 2022/0109308 A1    Apr. 7, 2022

Related U.S. Application Data

(63) Continuation of application No. PCT/JP2019/031928, filed on Aug. 14, 2019.

(51) Int. Cl.
*H02J 7/00* (2006.01)
*H02J 7/04* (2006.01)

(52) U.S. Cl.
CPC ........ *H02J 7/0031* (2013.01); *H02J 7/00034* (2020.01); *H02J 7/0047* (2013.01); *H02J 7/04* (2013.01); *H02J 7/0048* (2020.01); *H02J 7/005* (2020.01)

(58) Field of Classification Search
CPC .... H02J 7/0031; H02J 7/00034; H02J 7/0047; H02J 7/04; H02J 7/0048; H02J 7/005
See application file for complete search history.

(56) References Cited

U.S. PATENT DOCUMENTS

| 2004/0066171 | A1 | 4/2004 | Iichiro |
| 2010/0040939 | A1 | 2/2010 | Maegawa |
| 2012/0249057 | A1* | 10/2012 | Abe ......................... H02J 7/04 320/137 |
| 2016/0162849 | A1 | 6/2016 | Matsuyama |
| 2016/0226250 | A1* | 8/2016 | Fukubayashi ........... H02J 3/008 |

(Continued)

FOREIGN PATENT DOCUMENTS

| CN | 1494192 A | 5/2004 |
| CN | 104871199 A | 8/2015 |

(Continued)

OTHER PUBLICATIONS

Office Action issued for counterpart India Application No. 202217000106, issued by the Intellectual Property India on Jun. 9, 2022.

(Continued)

*Primary Examiner* — Zixuan Zhou

(57) ABSTRACT

A selecting device configured to select a combination of a plurality of secondary batteries that is used in a facility of a user is configured to acquire (A) period information about a period of time desired by the user, (B) facility consumption information about power consumption of the facility, and (C) output information including information of current peak power and information about a temporal change of future peak power of each secondary battery in a secondary battery group that becomes a candidate for the combination.

20 Claims, 7 Drawing Sheets

(56) References Cited

U.S. PATENT DOCUMENTS

| | | |
|---|---|---|
| 2016/0275727 A1 | 9/2016 | Kurimoto |
| 2017/0220086 A1* | 8/2017 | Suzuki ................. G06F 1/3212 |
| 2018/0090962 A1 | 3/2018 | Cha |
| 2018/0222343 A1 | 8/2018 | Uchida |
| 2019/0279315 A1* | 9/2019 | Takeuchi ................. H02J 3/14 |

FOREIGN PATENT DOCUMENTS

| | | |
|---|---|---|
| CN | 105121218 A | 12/2015 |
| CN | 105706290 A | 6/2016 |
| CN | 107534188 A | 1/2018 |
| EP | 2940649 A1 | 11/2015 |
| JP | 2010045002 A | 2/2010 |
| JP | 2012173928 A | 9/2012 |
| JP | 5167377 B2 | 3/2013 |
| JP | 2014041768 A | 3/2014 |
| JP | 2018128769 A | 8/2018 |

OTHER PUBLICATIONS

Office Action issued for counterpart Chinese Application 201980098570.X, issued by The State Intellectual Property Office of People's Republic of China on Dec. 25, 2024.

Li Dunfang et al., Comparison of spent portable battery recycling at home and abroad, Renewable Resources and Recycling Economy, Aug. 27, 2008, vol. 1, No. 8, China Academic Journal Electric Publishing House, China.

\* cited by examiner

| SECONDARY BATTERY ID | CURRENT SOH | CURRENT PEAK POWER[kW] | PREDICTED LIFESPAN[YEAR] | AESTHETIC DEGREE | PRICE [10,000YEN] |
|---|---|---|---|---|---|
| 10-1 | 20 | 1.0 | 7.1 | C | 2.0 |
| 10-2 | 30 | 0.5 | 5.2 | C | 1.0 |
| 10-3 | 90 | 0.4 | 10 | A | 6.0 |
| 10-4 | 60 | 0.8 | 9.3 | B | 5.0 |
| 10-5 | 50 | 0.6 | 7.6 | B | 2.5 |
| 10-6 | 30 | 1.2 | 9.6 | C | 7.0 |
| ⋮ | | | | | |
| 10-N | 80 | 0.7 | 8.0 | B | 6.0 |

FIG. 4

DESIGNATED POWER CONSUMPTION AMOUNT:4.0kWh/DAY⇒EXPECTED PEAK POWER 0.40kW
DESIRED PERIOD OF TIME: 7 YEARS
DESIRED AESTHETIC DEGREE: C OR HIGHER

| COMBINATION ID | PREDICTED LIFESPAN [YEAR] | NUMBER OF SECONDARY BATTERIES<br>EACH SECONDARY BATTERY ID:PEAK POWER [kW]<br>AFTER 7 YEARS<br>AESTHETIC DEGREE: PRICE[10,000YEN] | LABOR CHARGE [10,000YEN]<br>(OFFICIAL TRIP EXPENSE:<br>CONSTRUCTION EXPENSE) | TOTAL EXPENSE [10,000YEN] |
|---|---|---|---|---|
| A | 7.1 | 3<br>10-1:0.10:C:2.0<br>10-5:0.12:B:2.5<br>10-4:0.30:B:5.0 | 3.5(2.0, 1.5) | 13 |
| B | 9.3 | 2<br>10-4:0.30:B:5.0<br>10-6:0.50:C:7.0 | 3.0(2.0, 1.0) | 15 |

WHEN THE PERIOD OF TIME IS CHANGED TO 5 YEARS

| COMBINATION ID | PREDICTED LIFESPAN [YEAR] | NUMBER OF SECONDARY BATTERIES<br>EACH SECONDARY BATTERY ID:PEAK POWER [kW]<br>AFTER 5 YEARS<br>AESTHETIC DEGREE: PRICE[10,000YEN] | LABOR CHARGE[10,000YEN]<br>(OFFICIAL TRIP EXPENSE:<br>CONSTRUCTION EXPENSE) | INCENTIVE [10,000YEN] | TOTAL EXPENSE [10,000YEN] |
|---|---|---|---|---|---|
| C | 5.2 | 2<br>10-2:0.10:C:1.0<br>10-1:0.30:B:2.0 | 3.0(2.0, 1.0) | 1.0 | 5.0 |

FIG. 6

DESIGNATED POWER CONSUMPTION AMOUNT:4.0kWh/DAY⇒EXPECTED PEAK POWER 0.40kW
DESIRED PERIOD OF TIME: 7 YEARS
DESIRED AESTHETIC DEGREE: C OR HIGHER

| COMBINATION ID | PREDICTED LIFESPAN [YEAR] | NUMBER OF SECONDARY BATTERIES EACH SECONDARY BATTERY ID:PEAK POWER [kW] AFTER 7 YEARS AESTHETIC DEGREE: PRICE[10,000YEN] | LABOR CHARGE [10,000YEN] (OFFICIAL TRIP EXPENSE: CONSTRUCTION EXPENSE) | TOTAL EXPENSE [10,000YEN] |
|---|---|---|---|---|
| A | 7.1 | 3<br>10-1:0.10:C:2.0<br>10-5:0.12:B:2.5<br>10-4:0.30:B:5.0 | 3.5(2.0, 1.5) | 13 |
| B | 9.3 | 2<br>10-4:0.30:B:5.0<br>10-6:0.50:C:7.0 | 3.0(2.0, 1.0) | 15 |

WHEN THE PERIOD OF TIME IS CHANGED TO 5 YEARS

| COMBINATION ID | PREDICTED LIFESPAN [YEAR] | NUMBER OF SECONDARY BATTERIES EACH SECONDARY BATTERY ID:PEAK POWER [kW] AFTER 5 YEARS AESTHETIC DEGREE: PRICE[10,000YEN] | LABOR CHARGE[10,000YEN] (OFFICIAL TRIP EXPENSE: CONSTRUCTION EXPENSE) | INCENTIVE [10,000YEN] | TOTAL EXPENSE [10,000YEN] |
|---|---|---|---|---|---|
| C | 5.2 | 2<br>10-2:0.10:C:1.0<br>10-1:0.30:B:2.0 | 3.0(2.0, 1.0) | 1.0 | 5.0 |

FIG. 7

SELECTING DEVICE, SELECTING METHOD AND COMPUTER READABLE STORAGE MEDIUM

CROSS REFERENCE TO RELATED APPLICATION

The contents of the following Japanese patent application(s) are incorporated herein by reference:
NO. PCT/JP2019/031928 filed in WO on Aug. 14, 2019

BACKGROUND

1. Technical Field

The present invention relates to a selecting device, a selecting method and a computer readable storage medium.

2. Related Art

Known is a battery exchange support system configured to select a recycled assembled battery having a lifespan longer than a period of time up to a replacement-planned time input by a user and to notify a user of various expense information (an expense for exchange, a saved expense and a substantial actual expense) when the assembled battery is designated (for example, refer to Patent Document 1).

PRIOR ART DOCUMENT

Patent Document

Patent Document 1: Japanese Patent Application Publication NO. 2018-128769

BRIEF DESCRIPTION OF THE DRAWINGS

FIG. 4 is, as one example, a table that is stored in a storage unit 103 in the selecting device 100 of the present embodiment.

FIG. 6 is a display screen example on a user terminal 30 for displaying a plurality of combinations selected by the selecting device 100 of the present embodiment to the user 25, as one example.

FIG. 7 shows an example of a computer 1200 in which a plurality of aspects of the present invention may be entirely or partially implemented.

DESCRIPTION OF EXEMPLARY EMBODIMENTS

Figure 1:
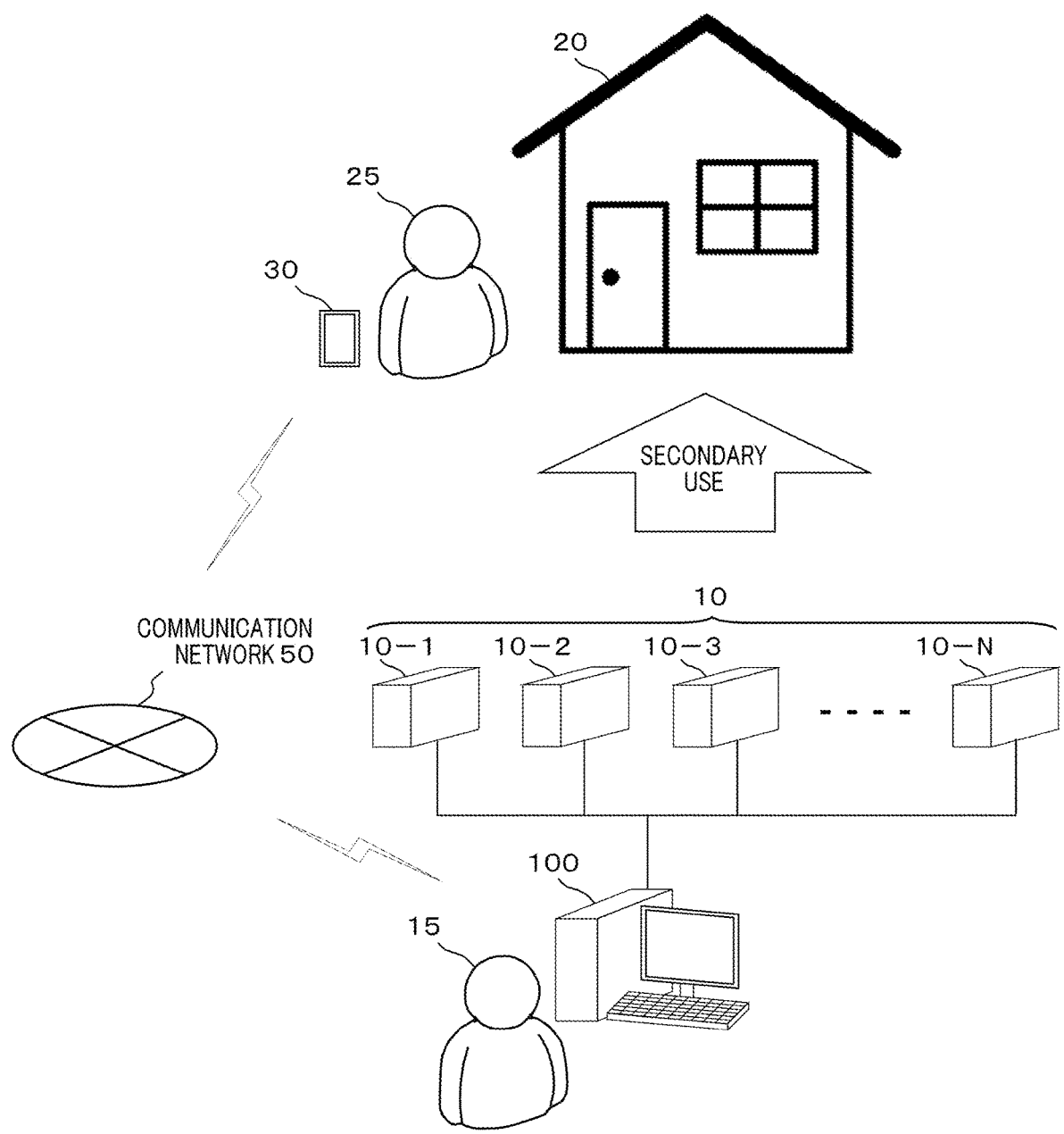
FIG. 1 is a view for illustrating that a selecting device 100 of the present embodiment selects a combination of a plurality of secondary batteries 10 used for a residential 20 of a user 25.

Hereinafter, (some) embodiment(s) of the present invention will be described. The embodiment(s) do(es) not limit the invention according to the claims. Also, all the combinations of the features described in the embodiment(s) are not necessarily essential to means provided by aspects of the invention. It should be noted that in the drawings, the same or similar parts are denoted with the same reference signs and the overlapping descriptions may be omitted.

FIG. 1 is a view for illustrating that a selecting device 100 of the present embodiment selects a combination of a plurality of secondary batteries 10 used for a residential 20 of a user 25. The secondary battery 10 of the present embodiment is primarily used in a vehicle configured to drive by a secondary battery, such as an EV and a PHEV, is then stored by a lender 15 who picks up and lends the secondary battery 10 primarily used, and is then secondarily used as a stationary storage battery in the residential 20 of the user 25, or the like, as one example. It should be noted that the secondary battery 10 primarily used may also be picked up and stored by a seller and may be then sold to the user 25.

In the residential 20 of the user 25, a combination of a plurality of secondary batteries 10 is installed. The plurality of secondary batteries 10 included in the combination may be connected with each other in series or in parallel or may be connected partially in parallel in a series connection. In the present embodiment, the combination of the plurality of secondary batteries 10 is used as a buffer for emergency in the residential 20, but instead of this, may also be used as a supply source of electrical power that is usually used together with electrical power from a system, electrical power generated by a solar light panel, or the like, in the residential 20. It should be noted that the residential 20 is one example of the facility, and other facilities such as buildings and factories other than the residential 20 are also possible.

The secondary battery 10 is, for example, an all-solid-state battery, a lithium ion battery or the like. FIG. 1 shows, as one example, N secondary batteries 10 from a secondary battery 10-1 to a secondary battery 10-N (N: natural number) stored under control of the lender 15. Specific IDs of 1 to N, for example, are allotted to the N secondary batteries 10 and are managed by the selecting device 100. The 1 to N secondary batteries 10 may be different from each other in current peak power and future deterioration speed, i.e., a degree of decrease of future peak power. In addition, the 1 to N secondary batteries 10 may be different from each other in stains and scratches in current look, i.e., in an aesthetic degree. It should be noted that the N secondary batteries 10 are one example of the secondary battery 10 group.

The user 25 has, for example, a user terminal 30 that is mobile communication equipment such as a smart phone and a tablet. The user terminal 30 may also be stationary communication equipment such as a desktop PC arranged in the residential 20 of the user 25. The user 25 inputs period information and facility consumption information to the user terminal 30 to transmit the same to the selecting device 100 via a communication network 50, together with a user ID for identifying the user 25.

The period information is information about a period of time desired by the user 25 for which a combination of the plurality of secondary batteries 10 is used in the residential 20. For example, the period information may be information indicative of a frequency to exchange the combination of the plurality of secondary batteries 10 with a new combination of a plurality of secondary batteries 10, such as once every 5 years and once every 10 years. In addition, for example, the period information may be information indicative of a designated date to exchange the combination of the plurality of secondary batteries 10 with a new combination of a plurality of secondary batteries 10, such as the end of 2025 and Apr. 18, 2026.

The facility consumption information is information about power consumption of the residential 20. For example, the facility consumption information may be information indicative of an amount of electrical power that the residential 20 consumes one day, such as 20 kWh/one day. In the present embodiment, the power consumption amount is, for example, a value that is recognized by the user 25 from description on a bill of electricity expense, but instead of this, may also be a measured value that is measured by an electricity meter installed in the residential 20.

In the present embodiment, the user 25 further inputs aesthetic information about an aesthetic degree of each secondary battery 10 of the combination desired by the user 25 to the user terminal 30 to transmit the same to the selecting device 100 via the communication network 50, together with the user Idling addition, in the present embodiment, the user 25 further confirms information of a plurality of combinations that is received from the selecting device 100 by the user terminal 30, inputs determination information, which indicates that it is determined that any one of the plurality of combinations indicated in the information is to be installed in the residential 20, and transmits the same to the selecting device 100 via the communication network 50, together with the user ID.

The selecting device 100 is configured to select, from the secondary battery 10 group becoming a candidate for the combination, one or more combinations, which at least, can supply electrical power corresponding to power consumption of the residential 20 recognized by the user 25 longer than the period of time desired by the user 25 and satisfy a predetermined condition corresponding to that a degree of decrease in peak power following elapse of the period of time is relatively great, based on the period information, the facility consumption information and output information. The output information includes information of current peak power and information about a temporal change of future peak power of each secondary battery 10 of the secondary battery 10 group.

The selecting device 100 of the present embodiment is further configured to select, from the one or more of the combinations selected from the secondary battery 10 group, one or more combinations that satisfy the aesthetic degree desired by the user 25, based on the aesthetic information and evaluation information about an evaluation on an aesthetic degree of each secondary battery in the secondary battery group. The selecting device 100 of the present embodiment may also be configured to select one or more secondary combinations that do not satisfy the at least any one condition, in addition to the one or more of the combinations.

The selecting device 100 of the present embodiment may be stationary communication equipment such as a desktop PC and a server that can communicate with the user terminal 30 via the communication network 50 and is installed in a retail store of the lender 15, for example. The selecting device 100 of the present embodiment is connected by wire to each secondary battery 10 of the secondary battery 10 group, which is managed by the lender 15. The selecting device 100 may also be wirelessly connected to each secondary battery 10 of the secondary battery 10 group. The selecting device 100 is configured to acquire the output information from each secondary battery 10, together with a secondary battery ID for identifying the secondary battery 10. It should be noted that the selecting device 100 may not be wiredly or wirelessly connected to each secondary battery 10 of the secondary battery 10 group and may be configured to acquire the output information from another device wiredly or wirelessly connected to the secondary battery 10 group, together with the secondary battery ID.

Figure 2:
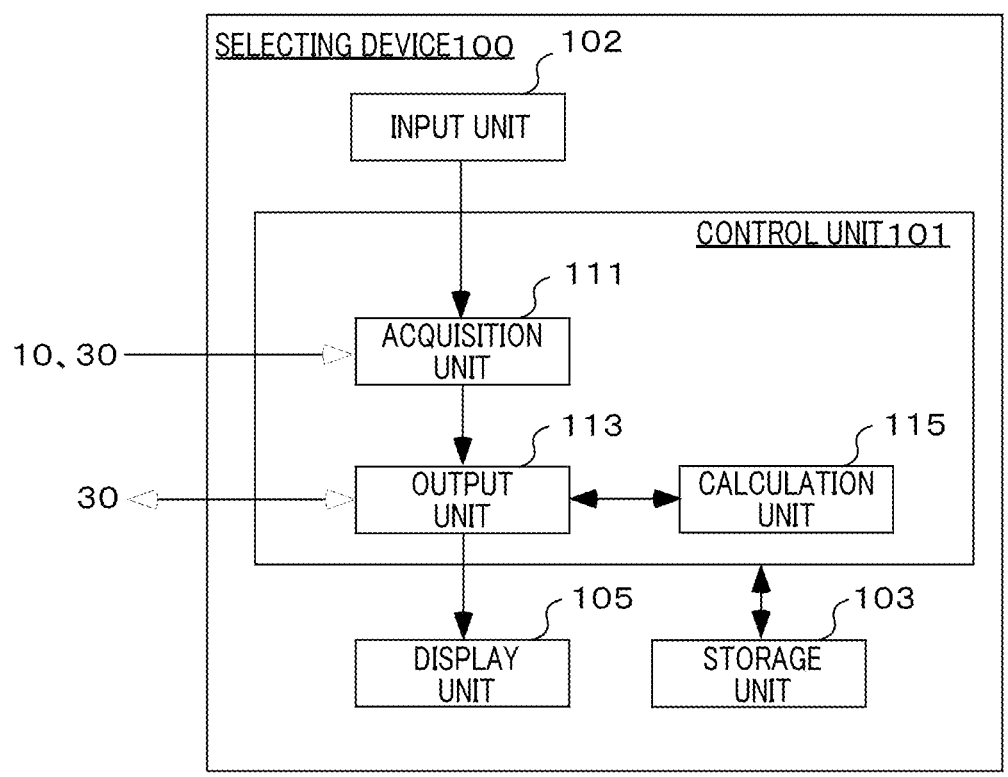
FIG. 2 is one example of a block diagram of the selecting device 100 of the present embodiment.

FIG. 2 is a block diagram of one example of the selecting device 100 of the present embodiment configured to acquire information from the user terminal 30 and information from the plurality of secondary batteries 10. The selecting device 100 of the present embodiment comprises a control unit 101, an input unit 102, a storage unit 103 and a display unit 105. The control unit 101 includes an acquisition unit 111 and an output unit 113. The control unit 101 of the present embodiment further includes a calculation unit 115. The input unit 102 is, for example, the above-mentioned input device, and the display unit 105 is, for example, the above-described display.

The acquisition unit 111 is configured to acquire the period information and the facility consumption information from the user terminal 30, together with the user ID. The acquisition unit 111 is also configured to acquire the output information from each secondary battery 10 of the secondary battery 10 group, together with the secondary battery ID. The acquisition unit 111 of the present embodiment is further configured to acquire the aesthetic information from the user terminal 30, together with the user ID. The acquisition unit 111 of the present embodiment is also configured to acquire the evaluation information together with the secondary battery ID of each secondary battery 10, through an input to the input unit 102 by the lender 15, for example. The acquisition unit 111 is configured to store the output information and evaluation information of each secondary battery 10 in the storage unit 103, together with the secondary battery ID. The acquisition unit 111 is also configured to output the period information, facility consumption information and aesthetic information of the user 25 to the output unit 113, together with the user ID.

The output unit 113 is configured to select, from the secondary battery 10 group, one or more combinations that can supply electrical power, which corresponds to the power consumption of the residential 20 indicated in the facility consumption information, longer than the period of time indicated in the period information and satisfy the above-mentioned condition, based on the period information, facility consumption information and output information of the user 25 input by the acquisition unit 111.

The output unit 113 of the present embodiment is configured to select, from the secondary battery 10 group, one or more combinations that satisfy the aesthetic degree indicated in the aesthetic information, based on the aesthetic information input by the acquisition unit 111 and the evaluation information of each secondary battery 10 stored in the storage unit 103. In other words, the output unit 113 of the present embodiment is configured to select one or more combinations that satisfy the aesthetic degree indicated in the aesthetic information, from the selected one or more combinations. The output unit 113 is further configured to output information of the selected one or more combinations.

The output unit 113 of the present embodiment is configured to output the information of the plurality of selected combinations to the calculation unit 115 and to transmit the information to the user terminal 30, together with a calculation result that is input from the calculation unit 115 as a result of the output. In addition, when the output unit 113 of the present embodiment receives the determination information indicative of the combination determined by the user 25 from the user terminal 30, the output unit 113 is configured to output the determination information to the display unit 105.

The calculation unit 115 is configured to calculate a total expense for exchange of a combination of the plurality of secondary batteries 10, for each of the plurality of combinations selected by the output unit 113, based on a price of each secondary battery 10 of the secondary battery 10 group and a labor charge. The price of each secondary battery 10 is determined according to at least the current peak power and the temporal change of the future peak power. The labor charge is a required expense for exchange of the combination of the plurality of secondary batteries 10 in the residential 20. The calculation unit 115 is configured to output a calculation result to the output unit 113.

The input unit 102 is an input device such as a keyboard and a mouse, for example. Information is input to the input unit 102 by the lender 15.

The storage unit 103 is configured to store each of the above-mentioned information, in addition to a sequence and a program for controlling each configuration of the selecting device 100. The storage unit 103 is referred by the control unit 101.

The display unit 105 is a display such as a monitor of a PC, for example. The display unit 105 is configured to display the determination information input by the output unit 113 to the lender 15. It should be noted that the display unit 105 may also be a touch panel display, for example. In this case, the display unit 105 may be integrated with the input unit 102.

Figure 3:
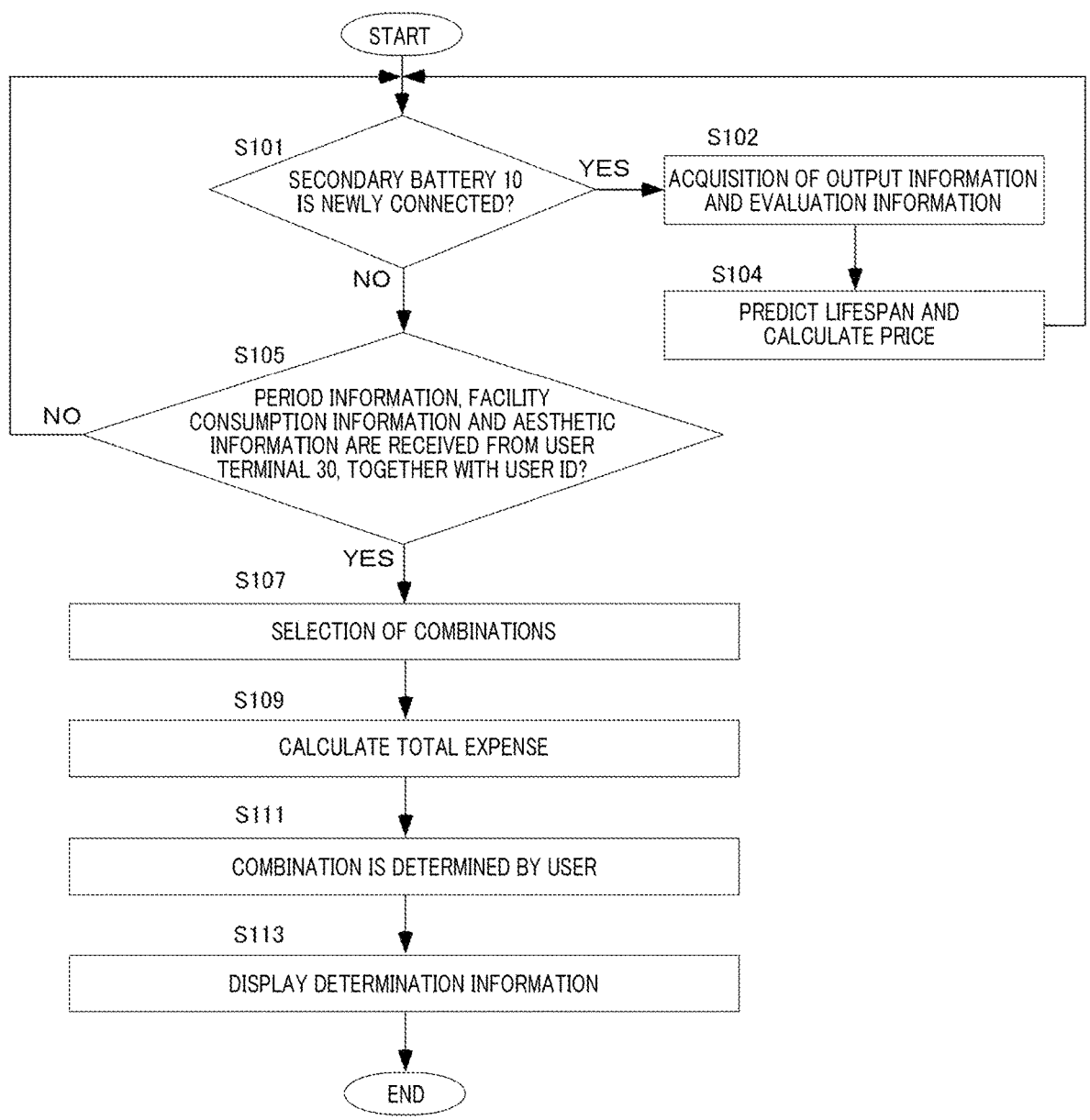
FIG. 3 is one example of a flow diagram of a selecting method of the present embodiment.

FIG. 3 is one example of a flow diagram of a selecting method of the present embodiment. Also, FIG. 4 is, as one example, a table that is stored in the storage unit 103 in the selecting device 100 of the present embodiment. The table of FIG. 4 is a matrix shape of (N+1) rows by six columns. On a first row of the table of FIG. 4, the secondary battery ID, the current SOH, the current peak power [kWh], the predicted lifespan, the aesthetic degree and the price [10,000 Yen] are indicated in order from a first column. On a second row to an (N+1)$^{th}$ row of the table of FIG. 4, N of 10-1, 10-2, 10-3, 10-4, 10-5, 10-6, . . . , 10-N are indicated, as the secondary battery ID. The respective secondary battery IDs of 10-1 to 10-N correspond to the N secondary batteries 10 of the secondary battery 10-1 to the secondary battery 10-N, respectively. In a second column to a sixth column of each row from the second row to the (N+1)$^{th}$ row of the table of FIG. 4, the information of the current SOH and the like of the secondary battery 10 having each secondary battery ID is input.

In the below, the flow of FIG. 3 is described with reference to the table of FIG. 4. The flow of FIG. 3 starts when a power supply of the selecting device 100 is turned on by the lender 15, as one example.

When the secondary battery 10 is newly connected to the selecting device 100 (step S101: YES), the acquisition unit 111 of the selecting device 100 acquires the output information from the secondary battery 10, together with the secondary battery ID, and acquires the evaluation information together with the secondary battery ID by the input of the lender 15 via the input unit 102 (step S102). It should be noted that the display unit 105 of the selecting device 100 may also display a message for causing the lender 15 to input the evaluation information.

In the information about the temporal change of the future peak power of the secondary battery 10, which is included in the output information, a deterioration degree (SOH [State of Health]) indicative of a degree of deterioration of the secondary battery 10 is indicated, as one example. The SOH of the secondary battery 10 is indicated by a capacity maintenance rate that is a percentage of a ratio of a capacity of the secondary battery 10 in a current state to a capacity of the secondary battery 10 in an under-utilized state. The SOH can also be defined as a value indicating a ratio of a current capacity to a nominal capacity of the secondary battery 10, as a percentage. It should be noted that in a case where the SOH of the secondary battery 10 is not indicated in the above-mentioned information and a capacity of the secondary battery 10 in an under-utilized state and a capacity of the secondary battery 10 in a current state are indicated, the acquisition unit 111 may calculate a current SOH, based on the information of the two types of capacities.

In addition, in the information about the temporal change of the future peak power of the secondary battery 10, a current deterioration state of the secondary battery 10 is also indicated, as one example The deterioration state indicates which member of a plurality of members such as a negative electrode and a positive electrode, for example, constituting the secondary battery 10 is damaged.

In the present embodiment, the evaluation information of the secondary battery 10 is input by the lender 15, as described above. For example, when the lender 15 newly picks up the primarily used secondary battery 10, the lender 15 may rank an aesthetic degree of the secondary battery 10, according to a predetermined evaluation criterion. The evaluation criterion may be one that evaluates the aesthetic degree of the secondary battery 10 low, proportional to a peeling degree of paint on a surface of the secondary battery 10, a number of scratches, an adhesion rate of stains that are difficult to remove, and the like, for example. The rank may be in order of B, C, D and F as the aesthetic degree decreases, with a state where the aesthetic degree is the best being A, for example.

In addition, the selecting device 100 itself may also be configured to acquire the evaluation information of the secondary battery 10 by using an imaging means or the like, irrespective of determination and input by a person such as the lender 15. Specifically, the selecting device 100 may be configured to image-capture a look of each secondary battery 10 by an imaging means such as a camera, and to analyze the captured image. The selecting device 100 may also be further configured to rank the aesthetic degree of the secondary battery 10 from the analyzed image, according to the evaluation criterion.

The acquisition unit 111 stores, in association with the secondary battery ID, the acquired output information and evaluation information, in the storage unit 103. The calculation unit 115 of the selecting device 100 further refers to the secondary battery ID and output information stored in the storage unit 103, and predicts the lifespan of the corresponding secondary battery 10, based on the output information (step S104).

The calculation unit 115 further refers to the evaluation information stored in the storage unit 103, and calculates a price of the corresponding secondary battery 10, considering the output information, the evaluation information and a result of the prediction (step S104). As one more specific example, the calculation unit 115 may calculate the price of the secondary battery 10 to be proportional to each of (1) a height of the current SOH of the secondary battery 10, (2) a magnitude of the current peak power of the secondary battery 10, (3) a length of the predicted lifespan of the secondary battery 10 and (4) goodness of the aesthetic degree of the secondary battery 10. The calculation unit 115 may also be configured to calculate the price of the secondary battery 10 by using a predetermined function where the above (1) to (4) are input variables. In addition, the price of the secondary battery 10 may be determined and input to the selecting device 100 by the lender 15, for example, instead of being calculated by the selecting device 100. The calculation unit 115 stores information indicative of the lifespan predicted for each secondary battery 10, and price information indicative of the calculated price in the storage unit 103, and the flow returns to step S101.

In step S101, when the secondary battery 10 is not newly connected to the selecting device 100 (step S101: NO), the acquisition unit 111 stands by until the period information, the facility consumption information and the aesthetic information are received from the user terminal 30, together with the user ID (step S105: NO). It should be noted that, when the secondary battery 10 is newly connected to the selecting device 100 during the standby, the acquisition unit 111 repeats step S102 to step S104.

The N secondary batteries 10 of the secondary battery 10-1 to the secondary battery 10-N are connected to the selecting device 100 and S102 to S104 of the flow are executed for all of the N secondary batteries 10, so that all the information is input into the table shown in FIG. 4.

When the acquisition unit 111 receives the period information, the facility consumption information and the aesthetic information from the user terminal 30, together with the user ID (step S105: YES), the acquisition unit 111 outputs the information to the output unit 113.

The output unit 113 selects, from the secondary battery 10 group, a plurality of combinations that satisfy a predetermined condition, based on the period information, facility consumption information and aesthetic information and the output information and evaluation information of each secondary battery 10 stored in the storage unit 103 (step S107). The condition includes that the aesthetic degree indicated in the aesthetic information is satisfied. The condition also includes that electrical power corresponding to power consumption of the residential 20 indicated in the facility consumption information can be supplied longer than a period of time indicated in the period information. The condition also includes a condition corresponding to that a degree of decrease in peak power following elapse of the period of time is relatively great.

The output unit 113 of the present embodiment is configured to select, as one of conditions corresponding to that the degree of decrease in peak power is relatively great, one combination including a plurality of secondary batteries 10 in order from a secondary battery whose degree of decrease in peak power following elapse of the period of time is greatest among a plurality of secondary batteries 10 that can supply electrical power corresponding to power consumption of the residential 20 indicated in the facility consumption information longer than the period of time indicated in the period information. The output unit 113 of the present embodiment may also be configured to select the combination in plural.

The output unit 113 of the present embodiment may also be configured to select, as one of the conditions, a plurality of combinations, which can supply electrical power corresponding to power consumption of the residential 20 indicated in the facility consumption information longer than the period of time indicated in the period information and whose degrees of decrease in peak power following elapse of the period of time are relatively great and available periods of time in the residential 20 are different from each other.

The output unit 113 of the present embodiment may also be further configured to select, from the secondary battery 10 group, one or more secondary combinations, which cannot supply electrical power corresponding to power consumption of the residential 20 indicated in the facility consumption information longer than the period of time indicated in the period information and satisfy a predetermined condition corresponding to that a degree of decrease in peak power prior to elapse of the period of time is relatively great, based on the period information and the facility consumption information input from the acquisition unit 111 and the output information of each secondary battery 10 stored in the storage unit 103.

The output unit 113 outputs the information of the plurality of combinations to the calculation unit 115, together with the information about the number of the secondary batteries 10 included in each combination and the secondary battery ID. When the information is input from the output unit 113, the calculation unit 115 calculates, for each combination, a labor charge necessary to exchange the combination in the residential 20. The calculation unit 115 further refers to the price information of each of the plurality of secondary batteries 10 included in the combinations among the price information of the plurality of secondary batteries 10 stored in the storage unit 103 in step S104, and calculates, for each combination, a total expense for exchange of the combination by summing the prices of the plurality of secondary batteries 10 included in the combination and the labor charge (step S109). It should be noted that the labor charge may be determined and input to the selecting device 100 by the lender 15, for example, instead of being calculated by the selecting device 100.

The calculation unit 115 of the present embodiment may also be configured to calculate, for each of one or more combinations and one or more secondary combinations selected by the output unit 113, the total expense for exchange of the combination of the plurality of secondary batteries 10, based on the prices and the labor charge.

The calculation unit 115 outputs, for each of the plurality of combinations, the information of each price of the plurality of secondary batteries 10 included in the combination, and the labor charge and the total expense necessary to exchange of the combination to the output unit 113, together with a combination ID for identifying the combination. The output unit 113 refers to the storage unit 103 and transmits the information of the plurality of combinations to an address of the user terminal 30 associated with the user ID, together with the user Idling the information of the plurality of combinations, as one example, for each of the plurality of combinations selected by the output unit 113, the predicted lifespan of the combination, the number, each secondary battery ID, each aesthetic degree and each price of the plurality of secondary batteries 10 included in the combination, the labor charge and the total expense for exchange of the combination are indicated together with the combination ID.

When the user terminal 30 receives the information of the plurality of combinations from the selecting device 100, together with the user ID, the user terminal 30 presents the information of the plurality of combinations to the user 25. The user 25 confirms the information of the plurality of combinations, inputs determination information, which indicates that it is determined that any one of the plurality of combinations indicated in the information is to be installed in the residential 20, and transmits the same to the selecting device 100 via the communication network 50, together with the user ID (step S111).

When the output unit 113 of the selecting device 100 receives the determination information indicative of the combination determined by the user 25 from the user terminal 30, the output unit 113 outputs the determination information to the display unit 105. The display unit 105 displays the determination information to the lender 15 (step S113), and the flow ends. It should be noted that the lender 15 may deliver the combination of the plurality of secondary batteries 10 determined by the user 25, which is indicated in the determination information displayed on the display unit 105 of the selecting device 100, to the residential 20 of the user 25, in a case where the secondary battery 10 has not been installed in the residential 20, the lender 15 may newly install the plurality of secondary batteries 10 of the combination in the residential 20, and in a case where a combination of the plurality of secondary batteries 10 has been installed in the residential 20, the lender 15 may exchange the combination with a new carried combination.

In the above flow, it has been described that step S102 to step S104 are executed when the secondary battery 10 is newly connected to the selecting device 100. However, since the information that is input to the table of FIG. 4 is all information that changes over time, the information is preferably updated periodically or all the time. Therefore, the selecting device 100 may be configured to periodically acquire the output information from each secondary battery 10 of the secondary battery 10 group under control, for example, to acquire new evaluation information that is input via the input unit 102 by the lender 15, and to change and store the same in the storage unit 103. Additionally or alternatively, the selecting device 100 may also be configured to update periodically or all the time the SOH and the like at first stored in the storage unit 103 at the time when each secondary battery 10 is first connected to the selecting device 100 by using a specific algorithm configured to lower each value over time.

Figure 5:
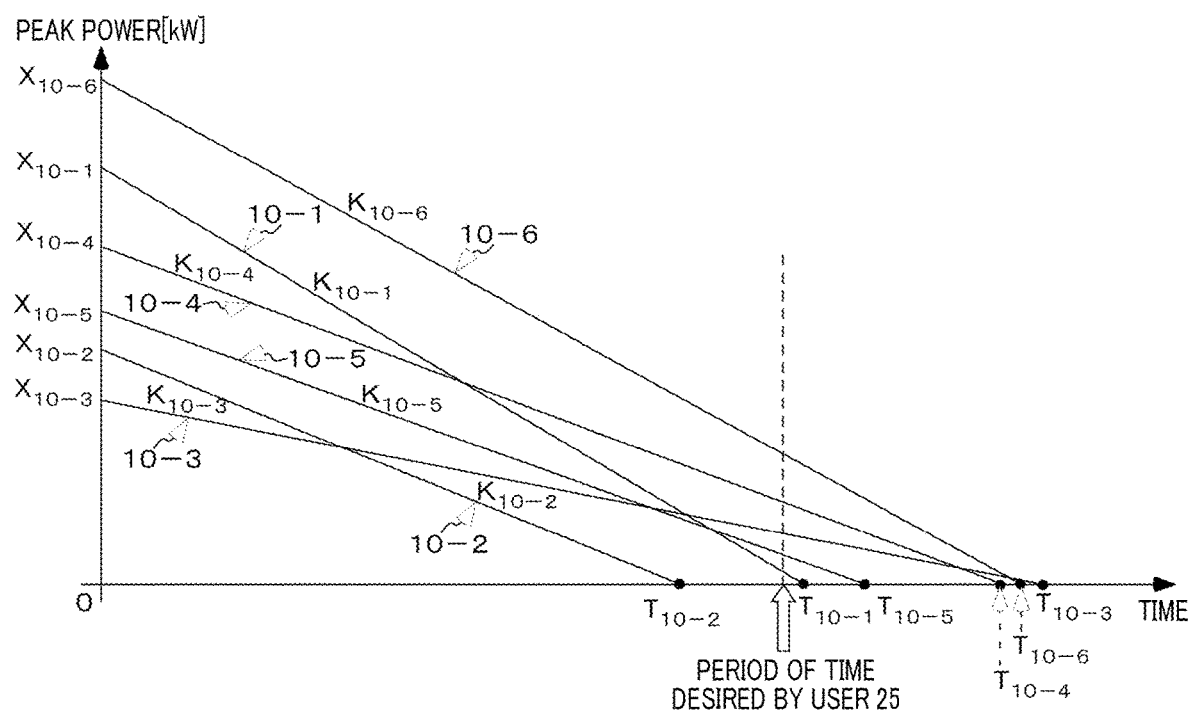
FIG. 5 is a graph for illustrating one example of a method by which the selecting device 100 of the present embodiment selects a combination of the plurality of secondary batteries 10 used for the residential 20 of the user 25.

FIG. 5 is a graph for illustrating one example of a method by which the selecting device 100 of the present embodiment selects a combination of the plurality of secondary batteries 10 used for the residential 20 of the user 25. In the graph, the horizontal axis indicates time and the vertical axis indicates peak power [kW].

On the graph of FIG. 5, the temporal change of the peak power is shown with a linear solid line for each of the six secondary batteries 10 of the secondary battery 10-1, the secondary battery 10-2, the secondary battery 10-3, the secondary battery 10-4, the secondary battery 10-5 and the secondary battery 10-6 shown in the table of FIG. 4. Also, on the graph of FIG. 5, in order to indicate a period of time desired by the user 25 for which a combination of the plurality of secondary batteries 10 is used in the residential 20, an end of the period of time is shown with a linear dashed line and an outlined arrow.

On the vertical axis of the graph of FIG. 5, intercepts of the solid lines indicative of the temporal changes of the peak powers of the secondary battery 10-1 to the secondary battery 10-6 are denoted with $X_{10-1}$ to $X_{10-6}$, respectively, and values of $X_{10-1}$ to $X_{10-6}$ mean the current peak powers of the secondary battery 10-1 to the secondary battery 10-6. For example, also as shown in the table of FIG. 4, the current peak power $X_{10-6}$ of the secondary battery 10-6 is greatest (1.2 [kW]), and the current peak power $X_{10-1}$ of the secondary battery 10-1 is 1.0 [kW], the current peak power $X_{10-4}$ of the secondary battery 10-4 is 0.8 [kW], the current peak power $X_{10-5}$ of the secondary battery 10-5 is 0.6 [kW], the current peak power $X_{10-2}$ of the secondary battery 10-2 is 0.5 [kW], and the current peak power $X_{10-3}$ of the secondary battery 10-3 is 0.4 [kW] in order.

In addition, on the graph of FIG. 5, gradients of solid lines indicative of the temporal changes of the peak powers of the secondary battery 10-1 to the secondary battery 10-6 are denoted with $K_{10-1}$ to $K_{10-6}$, respectively, and values of $K_{10-1}$ to $K_{10-6}$ may mean an example of degrees of decrease in peak powers of the secondary battery 10-1 to the secondary battery 10-6. That is, the smaller a negative value of K is, the greater the degree of decrease in peak power may be. In the graph of FIG. 5, since $K_{10-3} > K_{10-4} = K_{10-5} > K_{10-2} > K_{10-6} > K_{10-1}$, the selecting device 100 may regard that it is most difficult for the peak power of the secondary battery 10-3 to decrease and it is easier for the peak power to decrease in order of the secondary battery 10-4 and the secondary battery 10-5, the secondary battery 10-2, the secondary battery 10-6 and the secondary battery 10-1.

On the horizontal axis of the graph of FIG. 5, intercepts of the solid lines indicative of the temporal changes of the peak powers of the secondary battery 10-1 to the secondary battery 10-6 are denoted with $T_{10-1}$ to $T_{10-6}$, respectively, and values of $T_{10-1}$ to $T_{10-6}$ mean the predicted lifespans of the secondary battery 10-1 to the secondary battery 10-6. The values of $T_{10-1}$ to $T_{10-6}$ may mean an example of degrees of decrease in peak powers of the secondary battery 10-1 to the secondary battery 10-6. That is, the smaller a value of T is, the greater the degree of decrease in peak power may be. For example, also as shown in the table of FIG. 4, the predicted lifespan $T_{10-3}$ of the secondary battery 10-3 is greatest (10 [year]), and the predicted lifespan $T_{10-6}$ of the secondary battery 10-6 is 9.6 [year], the predicted lifespan $T_{10-4}$ of the secondary battery 10-4 is 9.3 [year], the predicted lifespan $T_{10-5}$ of the secondary battery 10-5 is 7.6 [year], the predicted lifespan $T_{10-1}$ of the secondary battery 10-1 is 7.1 [year], and the predicted lifespan $T_{10-2}$ of the secondary battery 10-2 is 5.2 [year] in order. Therefore, the selecting device 100 may regard that it is most difficult for the peak power of the secondary battery 10-3 to decrease and it is easier for the peak power to decrease in order of the secondary battery 10-6, the secondary battery 10-4, the secondary battery 10-5, the secondary battery 10-1 and the secondary battery 10-2.

As one example, it is assumed that the six-secondary battery 10 group of the secondary battery 10-1 to the secondary battery 10-6, as shown in FIG. 5, is a candidate for the plurality of secondary batteries 10 that is used in the residential 20 of the user 25. In a case where 7 years are indicated in the period information acquired from the user terminal 30, i.e., in a case where the desired period of time of the user 25 indicated on the graph of FIG. 5 is 7 years, the selecting device 100 of the present embodiment does not include the secondary battery 10-2 that cannot maintain a state where the peak power is greater than 0 kW for 7 years or longer, in the combination of the plurality of secondary batteries 10 that is presented to the user 25.

The selecting device 100 further selects the secondary batteries in order from the secondary battery 10 whose predicted lifespan is short, for example, of the five-secondary battery 10 group where the secondary battery 10-2 is excluded from the six-secondary battery 10 group. In a case where the total value of the peak powers of the plurality of selected secondary batteries 10 at a point of time of the end of the desired period of time of the user 25 indicated on the graph of FIG. 5 exceeds the power consumption of the residential 20 indicated in the facility consumption information, the selecting device 100 may end the additional selection of the secondary battery 10 and determine one combination by the plurality of selected secondary batteries 10.

FIG. 6 is a display screen example on the user terminal 30 for displaying a plurality of combinations selected by the selecting device 100 of the present embodiment to the user 25, as one example. On the display screen of FIG. 6, in detail information of the plurality of combinations selected by the selecting device 100, one of the six secondary batteries 10 of the secondary battery 10-1 to the secondary battery 10-6 described with reference to the table of FIG. 4 and the graph of FIG. 5 is shown.

At the top portion of the display screen of FIG. 6, in order from the top of the screen, three messages "designated power consumption amount: 4.0 kWh/day⇒expected peak power 0.40 kW", "desired period of time: 7 years" and "desired aesthetic degree: C or higher" are shown. The contents of the three messages correspond to the facility consumption information, the period information and the aesthetic information, respectively, which are input to the user terminal 30 by the user 25 before the selecting device 100 transmits the information of the plurality of combinations to the user terminal 30.

In the display screen of FIG. 6, a table including detail information of two combinations according to the designation and desire of the user 25 indicated in the three messages is shown immediately below the display position of the three messages. More specifically, the table is a matrix shape of 3 rows by 5 columns, and on a first row of the table, the combination ID, the predicted lifespan [year], details such as the number of the secondary batteries, the labor charge [10,000 Yen] (official trip expense: construction expense) and the total expense [10,000 Yen] are indicated in order from a first column. On a second row of the table, detail information of a combination A is indicated, and on a third row of the table, detail information of a combination B is indicated. The combination A and the combination B are different from each other in the period of time for which they can be used in the residential 20, as indicated in the second column of the table where the predicted lifespan is 7.1 [year] and 9.3 [year], respectively.

In addition, in the display screen of FIG. 6, a message "when the period of time is changed to 5 years' is indicated immediately below the table, and a table including detail information of a secondary combination with the change indicated in the message is indicated immediately below the message. More specifically, the table is a matrix shape of 2 rows by 6 columns, and on a first row of the table, the combination ID, the predicted lifespan [year], details such as the number of the secondary batteries, the labor charge [10,000 Yen] (official trip expense: construction expense), the incentive [−10,000 Yen] and the total expense [10,000 Yen] are indicated in order from a first column. On a second row of the table, detail information of a secondary combination C is indicated. The secondary combination C does not satisfy the desired period of time '7 years' of the designation and desire of the user 25 indicated in the three messages, as indicated with 'predicted lifespan is 5.2 [year]' on a second row of the table. However, the secondary combination C satisfies the designation and other desire of the user 25 indicated in the three messages.

In the present embodiment, in the display screen of FIG. 6, the labor charge indicated in the fourth columns of both the tables includes, as one example, an official trip expense for the lender 15 to deliver the plurality of secondary batteries 10 of each combination to the residential 20 of the user 25 and a construction expense for the lender 15 to install the plurality of secondary batteries 10 of each combination in the residential 20 of the user 25. The official trip expense may vary, according to a distance from a location of the lender 15 to the residential 20 of the user 25. In addition, the construction expense may vary, according to the number of the secondary batteries 10 included in the combination.

In the shown example, for the combination A, the combination B and the secondary combination C, since the delivery destination is the same, the official trip expense is the same 2 [10,000 Yen]. In addition, since the three secondary batteries 10 are included in the combination A, the construction expense is 3 [piece]×0.5 [10,000 Yen/piece]=1.5 [10,000 Yen]. In addition, since the two secondary batteries 10 are included in each of the combination B and the secondary combination C, the construction expense is 2 [piece]×0.5 [10,000 Yen/piece]=1.0 [10,000 Yen].

In this case, when the user ID and the information of the plurality of combinations are input from the output unit 113, for example, the calculation unit 115 of the present embodiment may refer to information of a function for performing the above-mentioned calculation and address information of the residential 20 associated with the user ID, which are stored in the storage unit 103, calculate the official trip expense and the construction expense, respectively, and therefore, calculate the labor charge.

As can be understood from both the tables in the display screen of FIG. 6, the output unit 113 of the present embodiment may further output information of an available period of time in the residential 20 and a total expense of each of one or more combinations and one or more secondary combinations and information of an incentive that is provided to the user 25 when at least one of the one or more secondary combinations is used in the residential 20. The incentive may be a pay-as-you-go value corresponding to a difference between a period of time desired by the user 25 and a period of time changed to shorten the period of time or may be a fixed value, for example.

It should be noted that additionally or alternatively, the selecting device 100 may also be configured to select and display one or more secondary combinations, which satisfy the period of time desired by the user 25 for which the combination of the plurality of secondary batteries 10 is used in the residential 20 but do not satisfy the aesthetic degree desired by the user 25, on the screen of the user terminal 30. In addition, additionally or alternatively, the selecting device 100 may also be configured to select and display one or more secondary combinations, which do not satisfy both the period of time desired by the user 25 for which the combination of the plurality of secondary batteries 10 is used in the residential 20 and the aesthetic degree desired by the user 25, on the screen of the user terminal 30.

According to the above-described embodiment, the selecting device 100 is configured to select, from the secondary battery 10 group, one or more combinations, which at least, can supply electrical power corresponding to power consumption of the residential 20 of the user 25 longer than the period of time desired by the user 25 and satisfy a predetermined condition corresponding to that a degree of decrease in peak power following elapse of the period of time is relatively great, based on (1) the period information about the period of time desired by the user 25 for which the combination of the plurality of secondary batteries 10 is used in the residential 20 of the user 25, (2) the facility consumption information about power consumption of the residential 20 of the user 25, and (3) the output information about the current peak power and the temporal change of the future peak power of each secondary battery 10 in the secondary battery 10 group becoming a candidate for the combination, and to output the information of the selected one or more combinations.

Thereby, as shown in the upper table of the display screen example of FIG. 6, the user 25 can acquire the information of the combinations whose degrees of decrease in peak power following elapse of the period of time desired by the user are relatively great, i.e., total expenses are relatively less expensive, within a range that satisfies the user's desire. On the other hand, the lender 15 who lends the above-mentioned combination to the user 25 can effectively lend the secondary battery 10, which is difficult to be reused and has low output power and short lifespan, to the user 25 from the secondary battery 10 group stocked for reuse, and can effectively utilize the plurality of secondary batteries 10 included in the secondary battery 10 group as much as possible.

In addition, the selecting device 100 having the above-mentioned configuration can disperse the combinations of the secondary batteries 10, which meet the demands of each user 25, in the right places. Therefore, the selecting device 100 can lend the secondary battery 10 of a low specification to the user 25 who does not need the secondary battery 10 of a high specification, and can lend the secondary battery 10 of a high specification to the user 25 who needs the secondary battery 10 of a high specification.

In addition, the selecting device 100 also may also be configured to select a plurality of combinations, which can supply electrical power corresponding to power consumption of the residential 20 indicated in the facility consumption information longer than the period of time indicated in the period information and whose degrees of decrease in peak power following elapse of the period of time are relatively great and available periods of time in the residential 20 are different from each other, and to output the information of the plurality of selected combinations. In this case, as shown in the upper table of the display screen example of FIG. 6, the user 25 can acquire the information of the plurality of combinations whose degrees of decrease in peak power following elapse of the period of time desired by the user are relatively great, i.e., total expenses are relatively less expensive, within a range that satisfies the user's desire, i.e., can increase a degree of freedom to determine one combination from a plurality of choices. For example, in a case where the user 25 determines the combination B, instead of the combination A shown in the upper table of the display screen example of FIG. 6, the total expense is 2 [10,000 Yen] more but the predicted lifespan is 2.1 [year] longer. Therefore, in the long term, the user 25 can reduce the expense, as compared to a case where the combination A is determined.

In addition, the selecting device 100 may also be configured to select, from the one or more of the combinations selected from the secondary battery 10 group, one or more combinations that satisfy the aesthetic degree desired by the user 25, based on the aesthetic information about the aesthetic degree of each secondary battery 10 of the combination desired by the user 25 and the evaluation information about the evaluation on the aesthetic degree of each secondary battery in the secondary battery group, and to output the information of the selected one or more combinations. In this case, as shown in the upper table of the display screen example of FIG. 6, the user 25 can reflect the user's desire about the aesthetic degree of the secondary battery 10 on the combination whose total expense is relatively less expensive. The above configuration can satisfy a degree of aesthetic satisfaction of the user 25 when the combination is installed so that the user 25 can visually recognize the combination as a part of the interior of the residential 20, for example.

In addition, the selecting device 100 may also be configured to select, from the secondary battery 10 group, one or more secondary combinations, which cannot supply electrical power corresponding to power consumption of the residential 20 indicated in the facility consumption information longer than the period of time indicated in the period information and satisfy a predetermined condition corresponding to that a degree of decrease in peak power prior to elapse of the period of time is relatively great, based on the period information, the facility consumption information and the output information, and to output information of the selected one or more combinations. In this case, the selecting device 100 may be further configured to output the information of the available period of time in the residential 20 and the total expense of each of one or more combinations and one or more secondary combinations and the information of the incentive that is provided to the user 25 when at least one of the one or more secondary combinations is used in the residential 20.

In this case, as shown in the lower table of the display screen example of FIG. 6, the user 25 can acquire the information of the plurality of combinations, which can supply electrical power corresponding to power consumption of the residential 20 designated by the user for a period of time slightly shorter than the period of time desired by the user and whose degrees of decrease in peak power following elapse of the slightly short period of time are relatively great, i.e., total expenses are relatively less expensive, i.e., can increase a degree of freedom to determine one combination from a plurality of choices. For example, in a case where the user 25 determines the secondary combination C, instead of the combination A shown in the upper table of the display screen example of FIG. 6, the predicted lifespan is 1.9 [year] shorter. However, in the short term, the user 25 can reduce the total expense by 8.0 [10,000 Yen], as compared to a case where the combination A is determined.

In the above-described embodiment, it has been described that the selecting device 100 is installed in the retail store of the lender 15. Instead of this, the selecting device 100 may also be arranged in the residential 20 of the user 25. In this case, the selecting device 100 may be configured to receive the output information of the secondary battery 10 group, which is retained and managed by the lender 15, for example, via the communication network 50. In addition, the selecting device 100 may be configured to transmit information, which indicates the combination determined by the user 25 from one or more combinations and the like selected by the above-described selecting method, to the communication equipment of the lender 15. The lender 15 may deliver the combination of the plurality of secondary batteries 10 determined by the user 25 to the residential 20 of the user 25, according to the received information.

In addition, in a case where the selecting device 100 is arranged in the residential 20 of the user 25 and is wiredly or wirelessly connected to one or more secondary batteries 10 installed and used in the residential 20, the selecting device 100 may be configured to additionally acquire the information indicative of the current SOH, the deterioration state and the like of the one or more secondary batteries 10, and to determine whether to exchange the one or more secondary batteries 10 with one or more secondary batteries 10 included in the secondary battery 10 group. The acquisition of the information may be repeatedly performed periodically from the time when the one or more secondary batteries 10 are installed in the residential 20, or periodically from the time when a predetermined period of time elapses after the one or more secondary batteries 10 are installed in the residential 20, by measuring the capacities of the one or more secondary batteries 10 or inspecting the deterioration state by the selecting device 100. The period of time may be designated via the input unit 102 of the selecting device 100 by the user 25, for example.

In addition, in a case where the selecting device 100 is arranged in the residential 20 of the user 25, additionally or alternatively, the selecting device 100 may be configured to estimate the current SOH, the deterioration state and the like of the one or more secondary batteries 10 installed and used in the residential 20, and to determine whether to exchange the one or more secondary batteries 10 with one or more secondary batteries 10 included in the secondary battery 10 group. Instead of this, the selecting device 100 may also be configured to estimate a time to exchange one or more secondary batteries 10 installed and used in the residential 20 with one or more secondary batteries 10 included in the secondary battery 10 group. In these cases, for example, when the one or more secondary batteries 10 are installed in the residential 20 by the lender 15, the selecting device 100 may be input with the information of the SOH, the deterioration state and the like of the one or more secondary batteries 10 at the time of the installation from the input unit 102 by the lender 15.

In any of the cases, when it is determined to exchange the one or more secondary batteries 10 with one or more secondary batteries 10 included in the secondary battery 10 group, the selecting device 100 may be configured to additionally notify the user 25 of the determination, thereby causing the user 25 to input the period information and the like. The notification may be transmission of an electronic mail to the user terminal 30, for example.

Also, instead of this, the user 25 may register in advance, in the selecting device 100, that the lender 15 automatically delivers one or more secondary batteries 10 for exchange when it is time to exchange the one or more secondary batteries 10. In this case, the user 25 also additionally registers the period information and the like in advance in the selecting device 100. When the selecting device 100 determines to exchange the one or more secondary batteries 10 with one or more secondary batteries 10 included in secondary battery 10 group, the selecting device 100 may execute the above-described selecting method, based on the period information and the like registered in advance. In addition, in this case, the selecting device 100 may not request the user 25 to input information by selecting one combination and transmitting information indicative of the combination to the communication equipment of the lender 15. In this case, it should be noted that the user 25 may register in advance, in the selecting device 100, for example, that the expense for exchange of the one or more secondary batteries 10 is paid from a designated bank account by automatic withdrawal.

In the above-described embodiment, it has been described that the selecting device 100 receives the period information, the facility consumption information, the aesthetic information and the like based on the input of the user 25, together with the user ID, via the communication network 50 from the user terminal 30. Instead of this, the lender 15 may hear the period information and the like from the user 25 and input the period information and the like from the input unit 102 of the selecting device 100, for example, instead of the user 25. In addition, instead of the user 25, the lender 15 may input the period information and the like to the communication equipment of the lender 15, the user terminal 30 tentatively borrowed from the user 25, or the like, and transmit the period information and the like to the selecting device 100.

Various embodiments of the present invention may be described with reference to flowcharts and block diagrams whose blocks may represent (1) steps of processes in which operations are performed or (2) units of devices responsible for performing operations. Certain steps and units may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

FIG. 7 shows an example of the computer 1200 which can realize a plurality of aspects of the present invention entirely or partially. A program installed on the computer 1200 can cause the computer 1200 to function as an operation associated with an apparatus according to embodiments of the present invention or as one or more "unit(s)" of the apparatus, or to perform the operation or the one or more "unit(s)", and/or can cause the computer 1200 to perform processes according to embodiments of the present invention or steps of the processes. Such a program may be executed by a CPU 1212 to cause the computer 1200 to perform particular operations associated with some or all blocks in the flowcharts or block diagrams described herein.

The computer 1200 according to the present embodiment includes a CPU 1212, a RAM 1214, a graphic controller 1216 and a display device 1218, which are connected to each other by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 via an input/output chip 1240.

The CPU 1212 operates in accordance with programs stored in the ROM 1230 and the RAM 1214, and controls each unit accordingly. The graphic controller 1216 acquires image data generated by the CPU 1212 on a frame buffer or the like provided in the RAM 1214 or in the graphic controller 1216 itself, and displays the image data on the display device 1218.

The communication interface 1222 communicates with other electronic devices via a network. The hard disk drive 1224 stores programs and data to be used by the CPU 1212 in the computer 1200. The DVD-ROM drive 1226 reads programs or data from the DVD-ROM 1201, and provides the programs or data to the hard disk drive 1224 via the RAM 1214. The IC card drive reads programs and data from an IC card and/or writes programs and data into the IC card.

The ROM 1230 has stored therein a boot program or the like to be executed by the computer 1200 at the time of activation, and/or a program that depends on the hardware of the computer 1200. The input/output chip 1240 may also connect various input/output units to the input/output controller 1220 via a parallel port, a serial port, a keyboard port, a mouse port or the like.

Programs are provided by a computer-readable storage medium such as the DVD-ROM 1201 or an IC card. The programs are read from the computer-readable storage medium, installed on the hard disk drive 1224, the RAM 1214 or the ROM 1230, which are also examples of a computer-readable storage medium, and executed by the CPU 1212. The information processing described in the programs is read into the computer 1200, resulting in cooperation between the programs and the above various types of hardware resources. An apparatus or method may be constituted by implementing the operation or processing of information in accordance with the use of the computer 1200.

For example, if a communication is performed between the computer 1200 and external devices, the CPU 1212 may execute a communication program loaded on the RAM 1214, and instruct the communication interface 1222 to perform communication process based on the process described in the communication program. Under the control of the CPU 1212, the communication interface 1222 reads transmission data stored in a transmission buffer region provided in a recording medium such as the RAM 1214, the hard disk drive 1224, the DVD-ROM 1201 or an IC card, and sends the read transmission data to the network, or writes reception data received from the network into a reception buffer region or the like provided in the recording medium.

The CPU 1212 may also make all or required portions of the files or databases stored in an external recording medium such as the hard disk drive 1224, the DVD-ROM drive 1226 (DVD-ROM 1201) or an IC card to be read by the RAM 1214, and perform various types of processing on the data on the RAM 1214. Then, the CPU 1212 may write back the processed data to the external recording medium.

Various types of information such as various types of programs, data, tables and databases may be stored in the recording medium for information processing. The CPU 1212 may perform various types of processing on the data read from the RAM 1214, which includes various types of operations, information processing, condition judging, conditional branch, unconditional branch, search/replacement of information, etc., as described throughout this disclosure and specified by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search the plurality of entries for an entry whose attribute value of the first attribute matches a designated condition, read the attribute value of the second attribute stored in the entry, and thereby acquire the attribute value of the second attribute associated with the first attribute that meets a predetermined condition.

The programs or software modules in the above description may be stored on the computer 1200 or a computer-readable storage medium near the computer 1200. Further, a recording medium such as a hard disk or a RAM provided in a server system connected to a dedicated communication network or the Internet can be used as a computer-readable storage media, which provides programs to the computer 1200 via the network.

While the embodiments of the present invention have been described, the technical scope of the invention is not limited to the above described embodiments. It is apparent to persons skilled in the art that various alterations or improvements can be added to the above-described embodiments. Also, matters explained with reference to a particular embodiment can be applied to other embodiments as long as such application does not cause a technical contradiction. Also, each component may have similar features to another component having the same name and a different reference number. It is also apparent from the scope of the claims that the embodiments added with such alterations or improvements can be included in the technical scope of the invention.

For example, the acquisition unit of the selecting device may be further configured to acquire vehicle consumption information about power consumption of a vehicle that is used by the user and driven by a secondary battery. In the vehicle, one or more secondary batteries for driving the vehicle are freely removed by the user. The vehicle may be a motorcycle, an automatic three-wheeled vehicle, an automatic four-wheeled vehicle or the like. The vehicle consumption information may be input to the user terminal together with the period information and the like by the user, and therefore, may be acquired via the communication network by the acquisition unit of the selecting device.

In this case, the output unit of the selecting device may be configured to select, from the secondary battery group under control, one or more secondary batteries, which can supply electrical power corresponding to power consumption of the vehicle indicated in the vehicle consumption information longer than the period of time indicated in the period information and satisfy a predetermined condition corresponding to that a degree of decrease in peak power following elapse of the period of time is relatively great, as a secondary battery that is shared in the facility and the vehicle of the user, based on the vehicle consumption information. The number of the one or more secondary batteries that are shared in the facility and the vehicle of the user may be equal to or smaller than the number of the secondary batteries that can be together attached to the vehicle. While the one or more secondary batteries are not used in the vehicle by the user, the one or more secondary batteries may be conveyed from the vehicle to the facility and attached to the facility by the user.

In this case, the output unit of the selecting device may be further configured to select, from the secondary battery group, one or more combinations including one or more secondary batteries, which can supply electrical power corresponding to power consumption of the facility longer than the period of time, have a relatively great degree of decrease in peak power following elapse of the period of time and satisfy the above condition, based on the period information, the facility consumption information and the output information. In this case, the output unit of the selecting device may be configured to select one or more secondary batteries in order from a secondary battery whose degree of decrease in peak power following elapse of the period of time is greatest among a plurality of secondary batteries that can supply electrical power corresponding to power consumption of the vehicle indicated in the vehicle consumption information longer than the period of time indicated in the period information, as the condition.

Furthermore, for example, the acquisition unit of the selecting device may be further configured to acquire maximum number information about a maximum quantity of pieces of the secondary batteries desired by the user, which are installed in the facility of the user. In this case, the output unit of the selecting device may be configured to select, from the secondary battery group, one or more combinations consisting of secondary batteries equal to or smaller than the maximum quantity of pieces, based on the maximum number information.

In this case, the output unit of the selecting device may be further configured to select, from the secondary battery group, one or more second secondary combinations, which consist of secondary batteries larger than the maximum quantity of pieces, can supply electrical power corresponding to power consumption of the facility longer than the period of time and satisfy the condition, based on the period information, the facility consumption information, the output information and the maximum number information.

In this case, the calculation unit of the selecting device may be configured to calculate a total expense for exchange of a combination of a plurality of secondary batteries, for each of one or more combinations and one or more second secondary combinations, based on a price determined according to at least the current peak power and the temporal change of the future peak power of each secondary battery in the secondary battery group, and a labor charge necessary to exchange a combination of a plurality of secondary batteries in the facility.

In this case, the output unit of the selecting device may be further configured to output the information of the total expense of each of one or more combinations and one or more second secondary combinations, the number of secondary batteries included in the one or more second secondary combinations, and the information of the incentive that is provided to the user when at least one of the one or more second secondary combinations is used in the facility.

In addition, the facility consumption information may include actual measurement information about a measured value of power consumption of the facility, for example. In this case, the output unit of the selecting device may be configured to select, from the secondary battery group, one or more combinations that can supply electrical power corresponding to the measured value longer than the period of time and satisfy the condition, based on the period information, the actual measurement information and the output information.

In this case, the output unit of the selecting device may be configured further to newly select, from the secondary battery group, one or more new combinations that can supply electrical power corresponding to the measured value longer than the period of time and satisfy the condition, based on the period information, the actual measurement information and the output information, and to output information of the one or more new combinations.

In this case, the measured value of power consumption of the facility may be measured by a meter attached to the facility. Also, in this case, a communication device for transmitting the measured value to the selecting device via the communication network may be installed in the facility, and information recorded on a bill of electricity expense may be input to the user terminal and transmitted to the selecting device by the user, or information recorded on a bill of electricity expense may be directly transmitted from an electricity provider to the selecting device without passing through the user, based on a contract between the user and the electricity provider.

Furthermore, for example, the output unit of the selecting device may be further configured to select, from the secondary battery group, one or more third secondary combinations, which do not satisfy the aesthetic degree, can supply electrical power corresponding to power consumption of the facility longer than the period of time and satisfy the condition, based on the period information, the facility consumption information, the output information, the aesthetic information and the evaluation information. In this case, the output unit of the selecting device may be further configured to output the information of the total expense for exchange of a combination of a plurality of secondary batteries different from each other according to the aesthetic degree of each of one or more combinations and one or more third secondary combinations, the information of aesthetic degrees of one or more third secondary combinations, and the information of the incentive that is provided to the user when at least one of the one or more third secondary combinations is used in the facility.

The operations, procedures, steps, and stages of each process performed by an apparatus, system, program, and method shown in the claims, specification, or diagrams can be performed in any order as long as the order is not indicated by "prior to," "before," or the like and as long as the output from a previous process is not used in a later process. Even if the process flow is described using phrases such as "first" or "next" in the claims, specification, or diagrams, it does not necessarily mean that the process must be performed in this order.

EXPLANATION OF REFERENCES 10, 10-1, 10-2, 10-3, 10-4, 10-5, 10-6, 10-N: secondary battery; 15 lender; 20 residential; 25 user; 30 user terminal; 50 communication network; 100 selecting device; 101 control unit; 102 input unit; 103 storage unit; 105 display unit; 111 acquisition unit; 113 output unit; 115 calculation unit; 1200 computer; 1201 DVD-ROM; 1210 host controller; 1212 CPU; 1214 RAM; 1216 graphic controller; 1218 display device; 1220 input/output controller; 1222 communication interface; 1224 hard disk drive; 1226 DVD-ROM drive; 1230 ROM; 1240 input/output chip 1242 keyboard

What is claimed is:

1. A selecting device configured to select a combination of a plurality of secondary batteries that is used in a facility of a user, the selecting device comprising:
    an acquisition unit configured to acquire (A) period information about a period of time desired by the user for which the combination is used in the facility, (B) facility consumption information about power consumption of the facility, and (C) output information including information of current peak power and information about a temporal change of future peak power of each secondary battery in a secondary battery group that becomes a candidate for the combination; and
    an output unit configured to select, from the secondary battery group, one or more of the combinations, which is capable of supplying electrical power corresponding to power consumption of the facility longer than the period of time and satisfy a predetermined condition corresponding to that a degree of decrease in peak power following elapse of the period of time is relatively great, based on the period information, the facility consumption information and the output information, and to output information of the one or more of the combinations.

2. The selecting device according to claim 1, wherein the output unit is configured to select the one or more of the combinations including a plurality of secondary batteries in order from a secondary battery whose degree of decrease in peak power following elapse of the period of time is greatest among a plurality of secondary batteries that is capable of supplying electrical power corresponding to power consumption of the facility longer than the period of time, as the condition.

3. The selecting device according to claim 1, wherein the acquisition unit is further configured to acquire vehicle consumption information about power consumption of a vehicle that is used by the user and driven by a secondary battery, and
the output unit is configured:
    to select, from the secondary battery group, one or more secondary batteries, which is capable of supplying electrical power corresponding to power consumption of the vehicle longer than the period of time and satisfy a predetermined second condition corresponding to that a degree of decrease in peak power following elapse of the period of time is relatively great, as a secondary battery that is shared in the facility and the vehicle, based on the vehicle consumption information, and
    to select the one or more of the combinations including one or more secondary batteries that satisfy the second condition, as the condition.

4. The selecting device according to claim 3, wherein the output unit is configured to select one or more secondary batteries in order from a secondary battery whose degree of decrease in peak power following elapse of the period of time is greatest among a plurality of secondary batteries that is capable of supplying electrical power corresponding to power consumption of the vehicle longer than the period of time, as the second condition.

5. The selecting device according to claim 1, wherein the output unit is configured to select a plurality of the combinations, which are capable of supplying electrical power corresponding to power consumption of the facility longer than the period of time and whose degrees of decrease in peak power following elapse of the period of time are relatively great and available periods of time in the facility are different from each other, as the condition.

6. The selecting device according to claim 2, wherein the output unit is configured to select a plurality of the combinations, which are capable of supplying electrical power corresponding to power consumption of the facility longer than the period of time and whose degrees of decrease in peak power following elapse of the period of time are relatively great and available periods of time in the facility are different from each other, as the condition.

7. The selecting device according to claim 3, wherein the output unit is configured to select a plurality of the combinations, which are capable of supplying electrical power corresponding to power consumption of the facility longer than the period of time and whose degrees of decrease in peak power following elapse of the period of time are relatively great and available periods of time in the facility are different from each other, as the condition.

8. The selecting device according to claim 4, wherein the output unit is configured to select a plurality of the combinations, which are capable of supplying electrical power corresponding to power consumption of the facility longer than the period of time and whose degrees of decrease in peak power following elapse of the period of time are relatively great and available periods of time in the facility are different from each other, as the condition.

9. The selecting device according to claim 5, further comprising a calculation unit configured to calculate a total expense for exchange of a combination of a plurality of secondary batteries, for each of the plurality of combinations, based on a price determined according to at least the current peak power and the temporal change of the future peak power of each secondary battery in the secondary battery group, and a labor charge necessary to exchange a combination of a plurality of secondary batteries in the facility.

10. The selecting device according to claim 1, wherein the output unit is further configured to select, from the secondary battery group, one or more secondary combinations, which cannot supply electrical power corresponding to power consumption of the facility longer than the period of time and satisfy a predetermined third condition corresponding to that a degree of decrease in peak power prior to elapse of the period of time is relatively great, based on the period information, the facility consumption information and the output information, and
the selecting device further comprises a calculation unit configured to calculate a total expense for exchange of a combination of a plurality of secondary batteries, for each of the one or more of the combinations and the one or more secondary combinations, based on a price determined according to at least the current peak power and the temporal change of the future peak power of each secondary battery in the secondary battery group, and a labor charge necessary to exchange a combination of a plurality of secondary batteries in the facility.

11. The selecting device according to claim 10, wherein the output unit is further configured to output information of available periods of time in the facility and the total expense of each of the one or more of the combinations and the one or more secondary combinations and information of an incentive that is provided to the user when at least one of the one or more secondary combinations is used in the facility.

12. The selecting device according to claim 1, wherein the acquisition unit is further configured to acquire maximum number information about a maximum quantity of pieces of the secondary batteries desired by the user, which are installed in the facility, and
the output unit is configured to select, from the secondary battery group, the one or more of the combinations consisting of secondary batteries equal to or smaller than the maximum quantity of pieces, based on the maximum number information.

13. The selecting device according to claim 1, wherein the acquisition unit is further configured to acquire maximum number information about a maximum quantity of pieces of the secondary batteries desired by the user, which are installed in the facility,
the output unit is configured to select, from the secondary battery group, the one or more of the combinations consisting of secondary batteries equal to or smaller than the maximum quantity of pieces, based on the maximum number information,
the output unit is further configured to select, from the secondary battery group, one or more second secondary combinations, which consist of secondary batteries larger than the maximum quantity of pieces, is capable of supplying electrical power corresponding to power consumption of the facility longer than the period of time and satisfy the condition, based on the period information, the facility consumption information, the output information and the maximum number information, and
the selecting device further comprises a calculation unit configured to calculate a total expense for exchange of a combination of a plurality of secondary batteries, for each of the one or more of the combinations and the one or more second secondary combinations, based on a price determined according to at least the current peak power and the temporal change of the future peak power of each secondary battery in the secondary battery group, and a labor charge necessary to exchange a combination of a plurality of secondary batteries in the facility.

14. The selecting device according to claim 13, wherein the output unit is further configured to output information of the total expense of each of the one or more of the combinations and the one or more second secondary combinations, a number of secondary batteries included in the one or more second secondary combinations, and information of an incentive that is provided to the user when at least one of the one or more second secondary combinations is used in the facility.

15. The selecting device according to any one of claim 1, wherein
the facility consumption information includes actual measurement information about a measured value of power consumption of the facility, and
the output unit is configured to select, from the secondary battery group, the one or more of the combinations that is capable of supplying electrical power corresponding to the measured value longer than the period of time and satisfy the condition, based on the period information, the actual measurement information and the output information.

16. The selecting device according to any one of claim 1, wherein
the facility consumption information includes actual measurement information about a measured value of power consumption of the facility, and
the output unit is further configured to newly select, from the secondary battery group, the one or more new combinations that is capable of supplying electrical power corresponding to the measured value longer than the period of time and satisfy the condition, based on the period information, the actual measurement information and the output information, and to output information of the one or more new combinations.

17. The selecting device according to claim 1, wherein the acquisition unit is further configured to acquire aesthetic information about an aesthetic degree of each secondary battery of the combination desired by the user and evaluation information about an evaluation on the aesthetic degree of each secondary battery of the secondary battery group, and
the output unit is configured to select, from the secondary battery group, the one or more of the combinations that satisfy the aesthetic degree, based on the aesthetic information and the evaluation information.

18. The selecting device according to claim 17, wherein the output unit is further configured:
to select, from the secondary battery group, one or more third secondary combinations, which do not satisfy the aesthetic degree, is capable of supplying electrical power corresponding to power consumption of the facility longer than the period of time and satisfy the condition, based on the period information, the facility consumption information, the output information, the aesthetic information and the evaluation information, and
to output information of a total expense for exchange of a combination of a plurality of secondary batteries different from each other according to the aesthetic degree of each of the one or more of the combinations and the one or more third secondary combinations, information of the aesthetic degrees of the one or more third secondary combinations, and information of an incentive that is provided to the user when at least one of the one or more third secondary combinations is used in the facility.

19. A selecting method of selecting a combination of a plurality of secondary batteries that is used in a facility of a user, the selecting method comprising:
acquiring (A) period information about a period of time desired by the user for which the combination is used in the facility, (B) facility consumption information about power consumption of the facility, and (C) output information including information of current peak power and information about a temporal change of future peak power of each secondary battery in a secondary battery group that becomes a candidate for the combination; and
selecting, from the secondary battery group, one or more of the combinations, which is capable of supplying electrical power corresponding to power consumption of the facility longer than the period of time and satisfy a predetermined condition corresponding to that a degree of decrease in peak power following elapse of the period of time is relatively great, based on the period information, the facility consumption information and the output information, and outputting information of the one or more of the combinations.

20. A non-transitory computer-readable storage medium having recorded thereon a program that, when executed by a computer configured to select a combination of a plurality of secondary batteries used in a facility of a user, causes the computer to perform operations comprising:

acquiring (A) period information about a period of time desired by the user for which the combination is used in the facility, (B) facility consumption information about power consumption of the facility, and (C) output information including information of current peak power and information about a temporal change of future peak power of each secondary battery in a secondary battery group that becomes a candidate for the combination; and selecting, from the secondary battery group, one or more of the combinations, which is capable of supplying electrical power corresponding to power consumption of the facility longer than the period of time and satisfy a predetermined condition corresponding to that a degree of decrease in peak power following elapse of the period of time is relatively great, based on the period information, the facility consumption information and the output information, and outputting information of the one or more of the combinations.

* * * * *